UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

No. 901,895.　　　Specification of Letters Patent.　　　Patented Oct. 20, 1908.

Application filed February 4, 1907. Serial No. 355,639.

*To all whom it may concern:*

Be it known that I, CARLETON ELLIS, of White Plains, in the county of Westchester and State of New York, have made certain new and useful Inventions Relating to Paint or Varnish Removers, of which the following is a specification.

This invention relates to paint or varnish removers and relates especially to compositions comprising large proportions of alcoholic bodies which are adapted for use on shellac and similar varnishes.

The alcoholic bodies, among which are found many valuable solvents, comprise the true saturated alcohols having the general formula $C_nH_{2n+2}O$. An alcoholic body forming an ingredient for a varnish remover can be beneficially aided in its action on varnishes of the shellac order by the addition of a small proportion of the next lower alcoholic body of the same series. For instance, where true saturated alcohols are used, the primary alcoholic solvent having the formula $C_nH_{2n+2}O$ is preferably used in conjunction with the next lower alcohol having the formula $C_{n-1}H_2(n-1)+2O$. Other solvents of a generally alcoholic character may, of course, be used in connection with such alcohols; for example, small proportions of ketonic solvents may be incorporated and also small proportions of the higher alcohols, that is, those containing more carbon atoms than the primary alcohol forming the bulk of the alcoholic solvent. Other solvents which act upon waxes or waxy bodies are also desirable, such as benzol and its homologues, toluol, xylol, cumol, mesitylene and also the lighter petroleum hydrocarbons, such as benzin and the like. Other hydrocarbon bodies may also be used for this purpose, such as lutidine, its homologues or isomers, and other solvents of the character of carbon bisulfid, carbon tetrachlorid or the like, may also be employed in some cases.

The large bulk of the remover solvent is preferably made up of the primary alcohol employed and a much smaller proportion composed of the next lower alcohol or alcoholic body, which may comprise from a few percent. up to 15 or 20 per cent. of the amount of the primary alcoholic body in some cases. To this mixture of alcoholic bodies a still smaller proportion of the hydrocarbon softening agent or wax solvent, such as benzol, and so forth, is preferably used, the whole being thoroughly incorporated and also in some cases the action of the remover is assisted by the incorporation therein of suitable stiffening material, such as wood flour, starch, whiting, infusorial earth or ceresin wax or other waxy or soapy material, which is preferably thoroughly incorporated with the other ingredients by agitation, sufficient heat being employed to dissolve the waxy bodies when used.

An illustrative remover embodying this invention may contain approximately propyl alcohol 16 parts, ethyl alcohol 3 parts, benzol 1 part, ceresin wax ¼ part and wood flour ⅔rds part. The wax is preferably first dissolved in the benzol which is then incorporated with the alcoholic bodies by agitation at a suitable temperature, the wood flour being gradually added to secure a homogeneous mixture. Another illustrative remover contains approximately butyl alcohol 100 parts, propyl alcohol 10 parts, benzol 1 part, benzin 2 parts, which are thoroughly incorporated by agitation.

In using these removers a roughing layer of the remover is preferably applied to the varnished surface by brushing over it, which is allowed to act until folds or roughnesses are formed in the varnish skin, whereupon a further quantity of the remover may be applied in a similar way so as to flood the surface acted upon, a plurality of flooding coats being used when desired to soften or loosen the varnish or other finish, the stiffening material indicated being, of course, of material assistance where inclined or vertical surfaces are treated. The wax softening agents referred to act upon the wax usually contained in the shellac in the varnish coating so as to aid in softening the same and allow the alcohol solvents to act upon and dissolve the gum forming the larger portion of the shellac.

This invention has been described in connection with a number of illustrative ingredients, formulas, proportions and processes, to the details of which disclosure the invention is not, of course, to be limited.

What is claimed is:—

1. The paint or varnish remover comprising approximately propyl alcohol 16 parts, ethyl alcohol 3 parts, benzol 1 part and stiffening material, including wax, 1 part.

2. The paint or varnish remover comprising approximately propyl alcohol 16 parts, ethyl alcohol 3 parts, a wax softening agent 1 part, and stiffening material.

3. The finish remover comprising approximately an alcoholic finish solvent 16 parts, the next lower alcoholic finish solvent of the same series 3 parts, aromatic finish softening material 1 part, ceresin wax ⅓ part and wood flour ⅔ parts.

CARLETON ELLIS.

Witnesses:
 JESSIE B. KAY,
 JOSEPH J. COLLINS.